United States Patent
Wang et al.

(10) Patent No.: US 10,562,819 B2
(45) Date of Patent: Feb. 18, 2020

(54) CERAMIC MATERIAL FOR MULTILAYER CERAMIC CAPACITOR AND METHOD OF MAKING THE SAME

(71) Applicant: National Taipei University of Technology, Taipei (TW)

(72) Inventors: Sea-Fue Wang, Taipei (TW); Yi-Xin Liu, Taipei (TW); Yen-Sheng Chen, Taipei (TW)

(73) Assignee: NATIONAL TAIPEI UNIVERSITY OF TECHNOLOGY, Taipei (TW)

(*) Notice: Subject to any disclaimer, the term of this patent is extended or adjusted under 35 U.S.C. 154(b) by 0 days.

(21) Appl. No.: 15/699,998

(22) Filed: Sep. 8, 2017

(65) Prior Publication Data
US 2018/0362410 A1 Dec. 20, 2018

(30) Foreign Application Priority Data
Jun. 19, 2017 (TW) .............................. 106120329 A

(51) Int. Cl.
| | |
|---|---|
| *C04B 35/64* | (2006.01) |
| *C04B 35/468* | (2006.01) |
| *C04B 35/626* | (2006.01) |
| *C04B 35/634* | (2006.01) |
| *C04B 35/638* | (2006.01) |

(Continued)

(52) U.S. Cl.
CPC ...... *C04B 35/4682* (2013.01); *C04B 35/6261* (2013.01); *C04B 35/638* (2013.01); *C04B 35/63416* (2013.01); *C04B 35/64* (2013.01); *H01G 4/1227* (2013.01); *H01G 4/30* (2013.01); *C04B 2235/3201* (2013.01); *C04B 2235/3215* (2013.01); *C04B 2235/3236* (2013.01); *C04B 2235/3251* (2013.01); *C04B 2235/3262* (2013.01); *C04B 2235/3263* (2013.01); *C04B 2235/3267* (2013.01); *C04B 2235/3298* (2013.01); *C04B 2235/442* (2013.01); *C04B 2235/448* (2013.01);
(Continued)

(58) Field of Classification Search
CPC ............. H01L 41/1878; H01L 41/1873; H01L 41/0973; H01L 41/1136; H01L 41/0805; B41J 2/14201; B41J 2/1433; C04B 35/462; C04B 35/49; C04B 35/6262
See application file for complete search history.

(56) References Cited

U.S. PATENT DOCUMENTS

| | | | |
|---|---|---|---|
| 2006/0224214 A1* | 10/2006 | Koller | A61F 6/04 607/62 |
| 2014/0239774 A1* | 8/2014 | Maurya | C04B 35/462 310/363 |

OTHER PUBLICATIONS

Sun et al. Effect of Oxygen Vacancy on Electrical Property of Acceptor DopedBaTiO3—Na0.5Bi0.5TiO3—Nb2O5 X8R Systems. J. Am. Ceram. Soc., 99 [9] 3067-3073 (2016).*

(Continued)

*Primary Examiner* — Noah S Wiese
(74) *Attorney, Agent, or Firm* — Womble Bond Dickinson (US) LLP

(57) ABSTRACT

A ceramic material for a multilayer ceramic capacitor has a capacitance variation from −17 percent to +15 percent at a temperature ranging from −55° C. to 200° C., and has a dielectric loss less than 1% at a temperature ranging from 90° C. to 200° C. The ceramic material includes a base component consisting of a barium titanate and a sodium bismuth titanate, and a manganese dopant in an amount not greater than 0.05 mole percent based on total moles of the base component.

7 Claims, 4 Drawing Sheets

(51) Int. Cl.
*H01G 4/12* (2006.01)
*H01G 4/30* (2006.01)

(52) U.S. Cl.
CPC .......... *C04B 2235/6021* (2013.01); *C04B 2235/656* (2013.01); *C04B 2235/6562* (2013.01); *C04B 2235/6583* (2013.01); *C04B 2235/96* (2013.01)

(56) References Cited

OTHER PUBLICATIONS

Xu et al. Effect of MnO addition on structure and electrical properties of (Na0.5Bi0.5)0.94Ba0.06TiO3 ceramics prepared by citrate method. Materials Science and Engineering B 130 (2006) 94-100.*

Sun et al. The role of Co in the BaTiO3—Na0.5Bi0.5TiO3 based X9R ceramics. Ceramics International 41 (2015) 931-939.*

Wang et al., "Hall effect and dielectric properties of Mn-doped barium titanate", Microelectronic Engineering, vol. 66, 2003, pp. 855-859.

Search Report appended to an Office Action issued to Taiwanese counterpart application No. 106120329 by the TIPO on Dec. 14, 2017, 2 pages (1 page of English Translation and 1 page of Original Document).

Langhammer et al., "Crystal Structure and Related Properties of Manganese-Doped Barium Titanate Ceramics", Journal of the American Ceramic Society, vol. 83, Issue 3, Mar. 2000, pp. 605-611.

Deng, Jun-Hao, "The research of Dielectric Properties of X9R Ceramics", Master Thesis, Jul. 2014, 83 pages.

* cited by examiner

CERAMIC MATERIAL FOR MULTILAYER CERAMIC CAPACITOR AND METHOD OF MAKING THE SAME

CROSS-REFERENCE TO RELATED APPLICATION

This application claims priority from Taiwanese patent application no. 106120329, filed on Jun. 19, 2017.

FIELD

The disclosure relates to a ceramic material, more particularly to a ceramic material for a multilayer ceramic capacitor.

BACKGROUND

Multilayer ceramic capacitors (MLCCs) are crucial for many electronic products, and have a relatively good volumetric efficiency. Barium titanate ($BaTiO_3$) is a ferroelectric ceramic material which is useful in the MLCCs. However, the $BaTiO_3$ is not stable especially at a temperature higher than the Curie temperature of the materials, and sodium bismuth titanate [$(Bi_{0.5}Na_{0.5})TiO_3$] is usually added to shift the Curie temperature of $BaTiO_3$ above 150° C.

Chinese patent publication no. 103936410 discloses a method for preparing high temperature stable barium titanate-based dielectric material doped with a manganese carbonate. The method includes the steps of: (a) mixing $Na_2CO_3$, $Bi_2O_3$, and $TiO_2$ in a mole ratio of 1:1:4, followed by calcining to obtain $Na_{0.5}Bi_{0.5}TiO_3$ particles; (b) mixing $Na_{0.5}Bi_{0.5}TiO_3$, $BaTiO_3$, $Nb_2O_5$ in a mass ratio of 1:6.2:0.17, followed by calcining at 1000° C. to obtain a frit; (c) adding glass powder (5 wt %) and manganese carbonate (4~4.5 wt %) to the frit, followed by milling and drying to obtain a mixture; (d) subjecting the mixture to granulation, molding, dewaxing, and sintering at 1130° C.~1160° C. to thereby form a manganese carbonate doped barium titanate-based dielectric material. Such dielectric material used in a multilayer ceramic capacitor may have a capacitance variance from −15 percent to +15 percent at a temperature ranging from 100° C. to 310° C. However, the dielectric loss of the dielectric material ranges from 4.5% to 4.99%.

SUMMARY

Therefore, an object of the disclosure is to provide a stable ceramic material for a multilayer ceramic capacitor which a capacitance variation from −17 percent to +15 percent at a temperature ranging from −55° C. to 200° C., and which has a dielectric loss less than 1% at a temperature ranging from 90° C. to 200° C.

According to a first aspect of the disclosure, a ceramic material is provided for a multilayer ceramic capacitor which has a capacitance variation from −17 percent to +15 percent at a temperature ranging from −55° C. to 200° C., and which has a dielectric loss less than 1% at a temperature ranging from 90° C. to 200° C. The ceramic material includes a base component consisting of a barium titanate and a sodium bismuth titanate, and a manganese dopant in an amount not greater than 0.05 mole percent based on total moles of the base component.

According to a second aspect of the disclosure, a method of making ceramic material for a multilayer ceramic capacitor which has a capacitance variation from −17 percent to +15 percent at a temperature ranging from −55° C. to 200° C., and which has a dielectric loss less than 1% at a temperature ranging from 90° C. to 200° C. The method includes the steps of: providing a base component consisting of a barium titanate and a sodium bismuth titanate; providing a manganese dopant in an amount not greater than 0.05 mole percent based on total moles of the base component; grinding a first mixture of the base component and the manganese dopant to obtain a ground powder; extruding a second mixture of the ground powder and an organic polymer under a predetermined pressure to obtain a green compact; heating the green compact at a temperature ranging from 550° C. to 580° C. for removal of the organic polymer to thereby obtain a precursor; and sintering the precursor at a temperature ranging from 1185° C. to 1260° C. under air atmosphere to thereby obtain a ceramic material.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
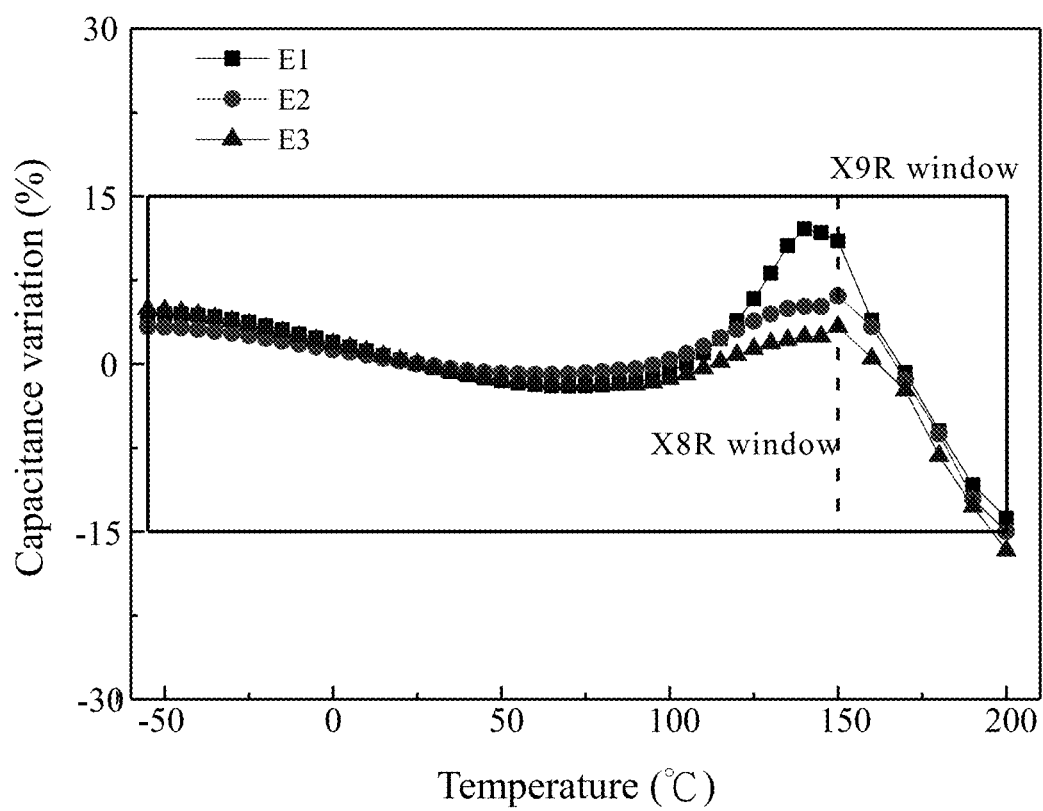
FIG. 1 is a graph illustrating the temperature coefficients of capacitance (TCCs) of ceramic materials E1 to E3 according to the disclosure.

A ceramic material according to an embodiment of the disclosure is used for a multilayer ceramic capacitor which has a capacitance variation from −17 percent to +15 percent at a temperature ranging from −55° C. to 200° C., and which has a dielectric loss less than 1% at a temperature ranging from 90° C. to 200° C. The ceramic material includes a base component and a manganese dopant.

The base component consists of a barium titanate ($BaTiO_3$) and a sodium bismuth titanate ($Bi_{0.5}Na_{0.5}TiO_3$). Preferably, a mole ratio of the barium titanate to the sodium bismuth titanate ranges from 8.5:1 to 9.5:1. In this embodiment, a mole ratio of the barium titanate to the sodium bismuth titanate is 9:1.

The manganese dopant is in an amount not greater than 0.05 mole percent based on total moles of the base component.

Preferably, the manganese dopant is in an amount ranging from 0.01 mole percent to 0.03 mole percent based on total moles of the base component.

Preferably, the manganese dopant is selected from the group consisting of $MnCO_3$, $MnO$, $MnO_2$, $MnSO_4$, $Mn_3O_4$, and combinations thereof. In this embodiment, the manganese dopant is $MnCO_3$.

Preferably, the ceramic material further includes a tantalum dopant in an amount ranging from 4 mole percent to 8 mole percent based on total moles of the base component.

Preferably, the tantalum dopant is tantalum pentoxide ($Ta_2O_5$).

A method of making the ceramic material includes steps (a) to (f).

In step (a), the base component is provided.

In step (b), the manganese dopant in an amount not greater than 0.05 mole percent based on total moles of the base component is provided.

In step (c), a first mixture of the base component and the manganese dopant is ground to obtain a ground powder. In this embodiment, the first mixture further includes the tantalum dopant.

In step (d), a second mixture of the ground powder and an organic polymer is extruded under a predetermined pressure to obtain a green compact. In this embodiment, the organic polymer is polyvinyl alcohol.

In step (e), the green compact is heated at a temperature ranging from 550° C. to 580° C. for removal of the organic polymer to thereby obtain a precursor.

In step (f), the precursor is sintered at a temperature ranging from 1185° C. to 1260° C. under air atmosphere to thereby obtain a ceramic material. In this step, the precursor is sintered under air atmosphere in absence of a reducing gas, such as hydrogen gas.

The embodiments of the disclosure will now be explained in more detail below by way of the following examples and comparative examples.

Preparation of Sodium Bismuth Titanate $Bi_2O_3$ (10.4542 g), $TiO_2$ (7.168 g), $Na_2CO_3$ (2.3775 g) were mixed and ground in presence of ethanol using grinding balls ($ZrO_2$) for 12 hours, followed by drying and calcining at 800° C. for 2 hours to obtain sodium bismuth titanate ($Bi_{0.5}Na_{0.5}TiO_3$).

Example 1

$BaTiO_3$, $Bi_{0.5}Na_{0.5}TiO_3$, $MnCO_3$, and $Ta_2O_5$ in a mole ratio of 0.9:0.1:0.01%: 4% were mixed and ground in presence of ethanol using grinding balls ($ZrO_2$) for 24 hours, followed by drying to obtain a ground powder. The ground powder (20 g) and polyvinyl alcohol (5 wt % based on the total weight of the ground powder) were mixed and sieved through 80 mesh, and then extruded using a uniaxial extruder under 150 MPa for 30 seconds to obtain a green compact with a diameter 9 mm and a thickness about 1 mm to 2 mm.

Thereafter, the green compact was placed in a crucible, heated at a rate of 5° C./min, and kept at 550° C. for 4 hours for removal of polyvinyl alcohol and other impurities, followed by sintering at 1215° C. under air atmosphere for 2 hours to obtain a ceramic material (E1).

Example 2

A ceramic material (E2) was made according to the process employed for making the ceramic material (E1), except that $BaTiO_3$, $Bi_{0.5}Na_{0.5}TiO_3$, $MnCO_3$, and $Ta_2O_5$ were in a mole ratio of 0.9:0.1:0.03%: 4%, and that the sintering temperature was set at 1200° C.

Example 3

A ceramic material (E3) was made according to the process employed for making the ceramic material (E2), except that $BaTiO_3$, $Bi_{0.5}Na_{0.5}TiO_3$, $MnCO_3$, and $Ta_2O_5$ were in a mole ratio of 0.9:0.1:0.05%: 4%.

Comparative Example 1

A ceramic material (CE1) was made according to the process employed for making the ceramic material (E1), except that $MnCO_3$ was not added, and that the sintering temperature was set at 1200° C.

Comparative Example 2

A ceramic material (CE2) was made according to the process employed for making the ceramic material (E1), except that $BaTiO_3$, $Bi_{0.5}Na_{0.5}TiO_3$, $MnCO_3$, and $Ta_2O_5$ were in a mole ratio of 0.9:0.1:0.2%: 4%, and that the sintering temperature was set at 1185° C.

Comparative Example 3

A ceramic material (CE3) was made according to the process employed for making the ceramic material (CE2), except that $BaTiO_3$, $Bi_{0.5}Na_{0.5}TiO_3$, $MnCO_3$, and $Ta_2O_5$ were in a mole ratio of 0.9:0.1:0.3%: 4%.

Comparative Example 4

A ceramic material (CE4) was made according to the process employed for making the ceramic material (CE2), except that $BaTiO_3$, $Bi_{0.5}Na_{0.5}TiO_3$, $MnCO_3$, and $Ta_2O_5$ were in a mole ratio of 0.9:0.1:0.4%: 4%.

Comparative Example 5

A ceramic material (CE5) was made according to the process employed for making the ceramic material (E1), except that $BaTiO_3$, $Bi_{0.5}Na_{0.5}TiO_3$, $MnCO_3$, and $Ta_2O_5$ were in a mole ratio of 0.9:0.1:0.5%: 4%, and that the sintering temperature was set at 1230° C.

Comparative Example 6

A ceramic material (CE6) was made according to the process employed for making the ceramic material (CE5), except that $BaTiO_3$, $Bi_{0.5}Na_{0.5}TiO_3$, $MnCO_3$, and $Ta_2O_5$ were in a mole ratio of 0.9:0.1:1%: 4%.

Comparative Example 7

A ceramic material (CE7) was made according to the process employed for making the ceramic material (CE5), except that $BaTiO_3$, $Bi_{0.5}Na_{0.5}TiO_3$, $MnCO_3$, and $Ta_2O_5$ were in a mole ratio of 0.9:0.1:2%: 4%.

Comparative Example 8

A ceramic material (CE8) was made according to the process employed for making the ceramic material (CE5), except that $BaTiO_3$, $Bi_{0.5}Na_{0.5}TiO_3$, $MnCO_3$, and $Ta_2O_5$ were in a mole ratio of 0.9:0.1:4%: 4%.

Comparative Example 9

A ceramic material (CE9) was made according to the process employed for making the ceramic material (CE5), except that $BaTiO_3$, $Bi_{0.5}Na_{0.5}TiO_3$, $MnCO_3$, and $Ta_2O_5$ were in a mole ratio of 0.9:0.1:4.5%: 4%.

Comparative Example 10

A ceramic material (CE10) was made according to the process employed for making the ceramic material (E1), except that $BaTiO_3$, $Bi_{0.5}Na_{0.5}TiO_3$, $MnCO_3$, and $Ta_2O_5$ were in a mole ratio of 0.9:0.1:8%: 4% and that the sintering temperature was set at 1185° C. In this case, the manganese carbonate ($MnCO_3$) was in an amount of about wt % based on the total weight of $BaTiO_3$ and $Bi_{0.5}Na_{0.5}TiO_3$.

[Test]

Upper and lower surfaces of ceramic material E1 were polished using sandpaper (no. 800), cleaned, dried, and coated with a silver/palladium conductive paste, followed by curing under 800° C. A potential (1V) was applied to ceramic material E1 through the conductive pastes on its upper and lower surfaces, a working frequency was set at 1 kHz, and variations of capacitance and dielectric loss with temperature were measured.

Variations of capacitance and dielectric loss (tan δ) with temperature for each of ceramic materials of E2 to E3 and CE1 to CE10 were also measured according to the procedures employed for ceramic material E1. The results were shown in FIGS. 1 to 4.

As shown in FIG. 1, each of ceramic materials E1 to E3 has a capacitance variation from −17 percent to +15 percent at a temperature ranging from −55° C. to 200° C. Each of ceramic materials E1 and E2 has a capacitance variation from −15 percent to +15 percent at a temperature ranging from −55° C. to 200° C., which satisfies an X9R capacitor based on the EIA RS-198 standard. Ceramic material E3 has a capacitance variation from −15 percent to +15 percent at a temperature ranging from −55° C. to 150° C., which satisfies an X8R capacitor based on the EIA RS-198 standard.

Figure 2:
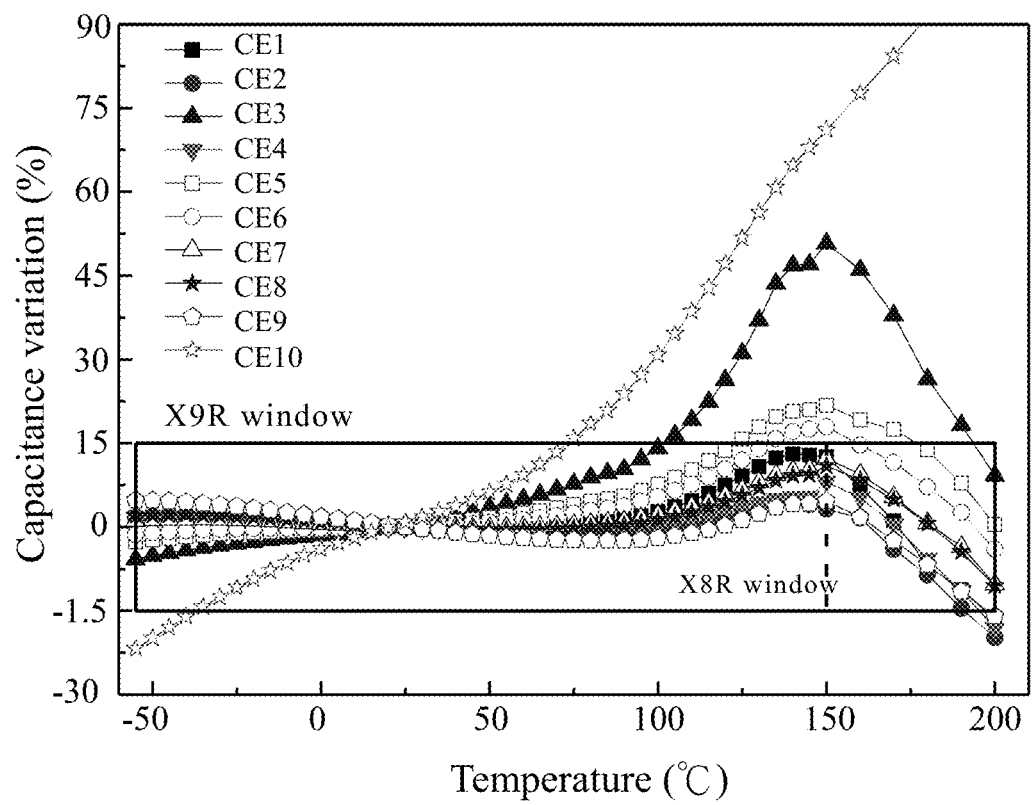
FIG. 2 is a graph illustrating the temperature coefficients of capacitance (TCCs) of ceramic materials CE 1 to CE 10.

As shown in FIG. 2, each of ceramic materials CE3, CE5, CE6, and CE10 has a capacitance variation greater than +17 percent at 150° C., which does not satisfy an X9R or X8R capacitor based on the EIA RS-198 standard. Each of ceramic materials CE2 and CE4 has a capacitance variation less than −18 percent at 200° C., which does not satisfy an X9R capacitor based on the EIA RS-198 standard.

Figure 3:
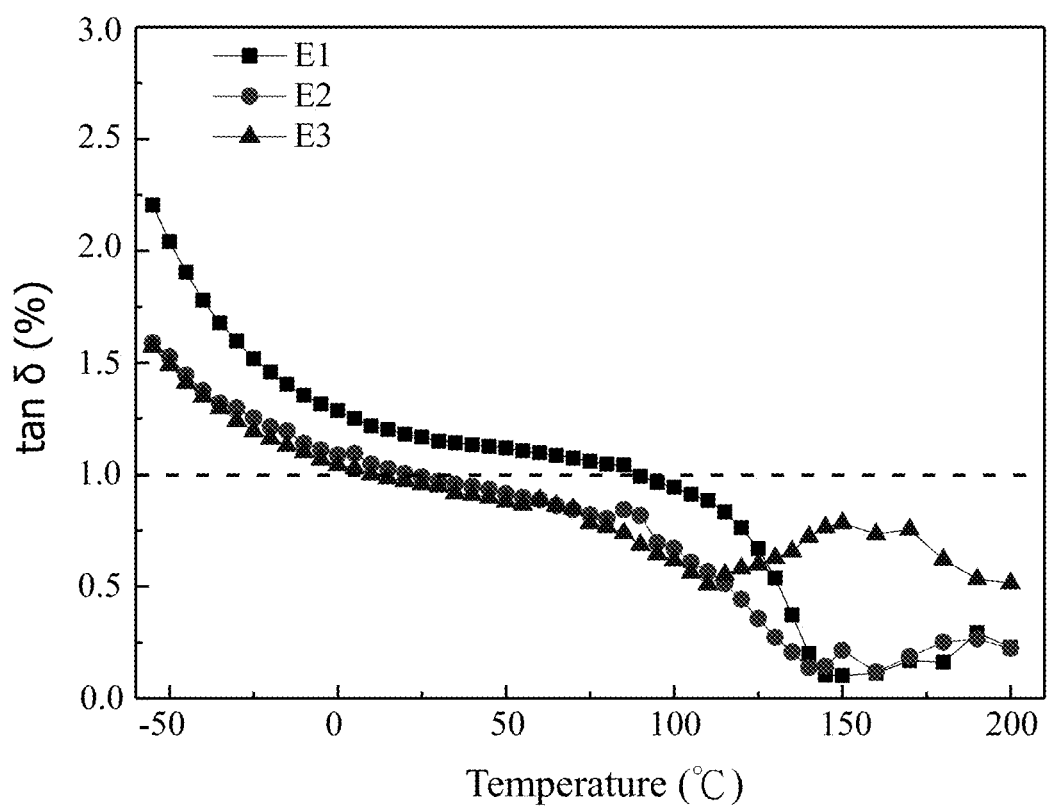
FIG. 3 is a graph illustrating the variation of dielectric loss with temperature of ceramic materials E1 to E3.

As shown in FIG. 3, each of ceramic materials E1 to E3 has a dielectric loss less than 1% at a temperature ranging from 90° C. to 200° C.

Figure 4:
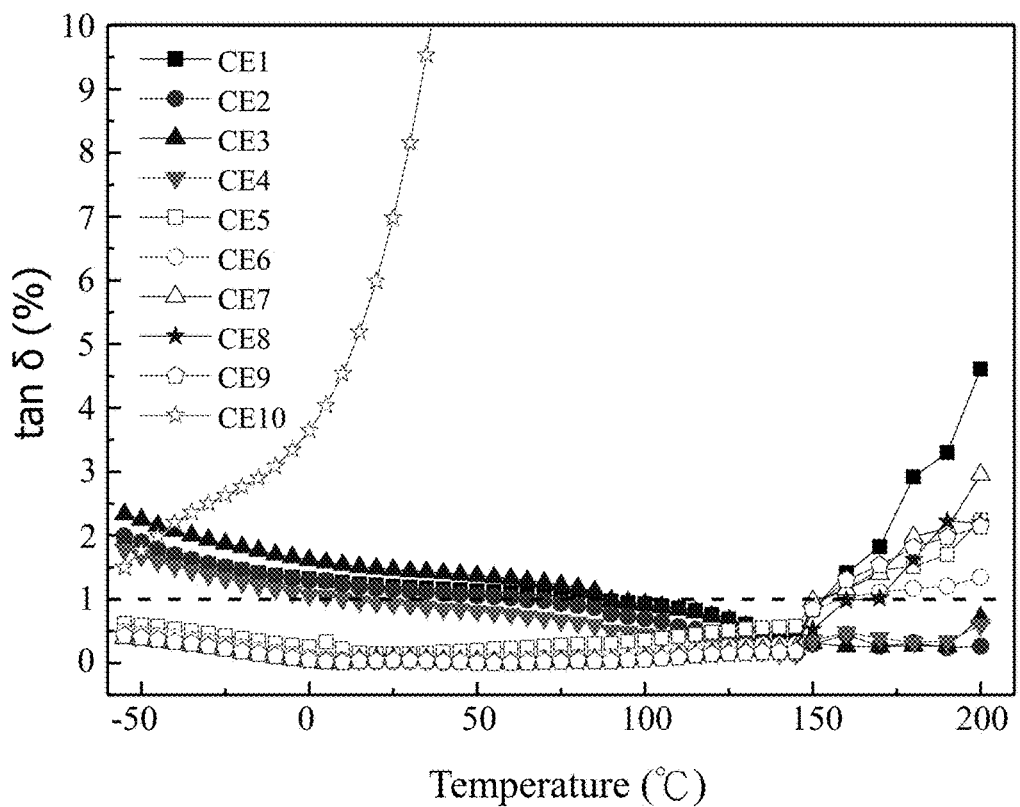
FIG. 4 is a graph illustrating the variation of dielectric loss with temperature of ceramic materials CE 1 to CE 10.

As shown in FIG. 4, each of ceramic materials CE1, CE5 to CE10 has a dielectric loss greater than 1% at a temperature ranging from 90° C. to 200° C.

In summary, the ceramic materials of E1 to E3 have capacitance variation from −17 percent to +15 percent at a temperature ranging from −55° C. to 200° C., and have a dielectric loss less than 1% at a temperature ranging from 90° C. to 200° C. As such, when the ceramic materials of E1 to E3 used in a multilayer ceramic capacitor, the multilayer ceramic capacitor may be operated at a wider working temperature, and the electricity applied to the multilayer ceramic capacitor is less likely to be converted into heat energy.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A ceramic material for a multilayer ceramic capacitor which has a capacitance variation from −17 percent to +15 percent throughout a temperature range from −55° C. to 200° C., and which has a dielectric loss less than 1% throughout a temperature range from 90° C. to 200° C., said ceramic material comprising
   a base component consisting of a barium titanate and a sodium bismuth titanate,
   a manganese dopant in an amount greater than 0 mole percent and not greater than 0.05 mole percent based on total moles of said base component, and
   a tantalum dopant in an amount ranging from 4 mole percent to 8 mole percent based on total moles of said base component, wherein said tantalum dopant is tantalum pentoxide.

2. The ceramic material according to claim 1, wherein said manganese dopant is in an amount ranging from 0.01 mole percent to 0.03 mole percent based on total moles of said base component.

3. The ceramic material according to claim 1, wherein said manganese dopant is selected from the group consisting of $MnCO_3$, $MnO$, $MnO_2$, $MnSO_4$, $Mn_3O_4$, and combinations thereof.

4. The ceramic material according to claim 1, wherein a mole ratio of said barium titanate to said sodium bismuth titanate ranges from 8.5:1 to 9.5:1.

5. A method of making ceramic material for a multilayer ceramic capacitor which has a capacitance variation from −17 percent to +15 percent throughout a temperature range from −55° C. to 200° C., and which has a dielectric loss less than 1% throughout a temperature range from 90° C. to 200° C., the method including the steps of:
   providing a base component consisting of a barium titanate and a sodium bismuth titanate;
   providing a manganese dopant in an amount greater than 0 mole percent and not greater than 0.05 mole percent based on total moles of the base component;
   grinding a first mixture of the base component and the manganese dopant to obtain a ground powder;
   extruding a second mixture of the ground powder and an organic polymer under a predetermined pressure to obtain a green compact;
   heating the green compact at a temperature ranging from 550° C. to 580° C. for removal of the organic polymer to thereby obtain a precursor; and
   sintering the precursor at a temperature ranging from 1185° C. to 1260° C. under air atmosphere to thereby obtain a ceramic material,
   wherein the first mixture further includes a tantalum dopant.

6. The method according to claim 5, wherein the precursor is sintered under air atmosphere in absence of a reducing gas.

7. The method according to claim 5, wherein the manganese dopant is selected from the group consisting of $MnCO_3$, $MnO$, $MnO_2$, $MnSO_4$, $Mn_3O_4$, and combinations thereof.

* * * * *